United States Patent
Chrisman

(10) Patent No.: US 8,185,671 B2
(45) Date of Patent: May 22, 2012

(54) TECHNIQUE FOR INCREASING CONTROL AND STATUS SIGNAL DENSITY IN A FIXED REGISTER ADDRESS SPACE

(75) Inventor: Nathan C. Chrisman, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/592,659

(22) Filed: Nov. 3, 2006

(65) Prior Publication Data

US 2008/0109578 A1    May 8, 2008

(51) Int. Cl.
*G06F 3/00* (2006.01)
*G06F 13/12* (2006.01)
*G06F 13/38* (2006.01)

(52) U.S. Cl. .............. 710/19; 710/7; 710/15; 710/20; 710/21; 710/31; 710/53; 710/74

(58) Field of Classification Search ............... 710/15, 710/20, 21, 31, 53, 7, 19, 74
See application file for complete search history.

(56) References Cited

U.S. PATENT DOCUMENTS

| | | | | |
|---|---|---|---|---|
| 4,449,196 A | * | 5/1984 | Pritchard | 708/670 |
| 5,491,660 A | | 2/1996 | Ashmore, Jr. | |
| 5,685,009 A | * | 11/1997 | Blomgren et al. | 712/23 |
| 6,314,486 B1 | | 11/2001 | Schulz et al. | |
| 6,430,630 B1 | * | 8/2002 | Hung | 710/22 |
| 6,704,516 B1 | * | 3/2004 | Dorsey et al. | 398/138 |
| 2002/0016897 A1 | * | 2/2002 | Nerl | 711/170 |
| 2005/0097263 A1 | | 5/2005 | Wurzburg | |
| 2005/0288828 A1 | * | 12/2005 | Claseman | 701/1 |
| 2006/0248267 A1 | | 11/2006 | Xie | |

FOREIGN PATENT DOCUMENTS

| | | |
|---|---|---|
| JP | 06188851 | 7/1994 |
| JP | 2001251328 | 9/2001 |
| KR | 10-1997-0016947 | 4/1997 |
| KR | 10-1997-0049487 | 7/1997 |

OTHER PUBLICATIONS

Korean Patent Office, International Search Report and Written Opinion for International Application No. PCT/US2007/082873, 11 Pgs., Apr. 15, 2008.
Korean Patent Application, Korean Office Action issued in corresponding KR Application No. 10-2009-7009230, dated Jul. 15, 2011, 6 pgs.
Japanese Patent Application, Japanese Office Action issued in corresponding JP Application No. 2009-535414, dated Jul. 5, 2011, 4 pgs.

* cited by examiner

*Primary Examiner* — Chun-Kuan Lee
*Assistant Examiner* — Farley Abad
(74) *Attorney, Agent, or Firm* — Trop, Pruner & Hu, P.C.

(57) ABSTRACT

A plurality of registers may function as both the control and status registers. Each bit location of the registers is writable to set a value on a control signal and readable to read a current value on a status signal. A multiplexer provides readability of the current value of each of the registers.

7 Claims, 2 Drawing Sheets

TECHNIQUE FOR INCREASING CONTROL AND STATUS SIGNAL DENSITY IN A FIXED REGISTER ADDRESS SPACE

BACKGROUND

Description of the Related Art

Legacy issues are common in the computer industry. When creating a next generation device, design characteristics are often limited due to compatibility and other issues with legacy devices. For example, next generation devices are often restricted to a given address space. Control and status signals for new features of the next generation devices are often difficult to add due to address space limitations.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

Description of the Embodiment(s)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
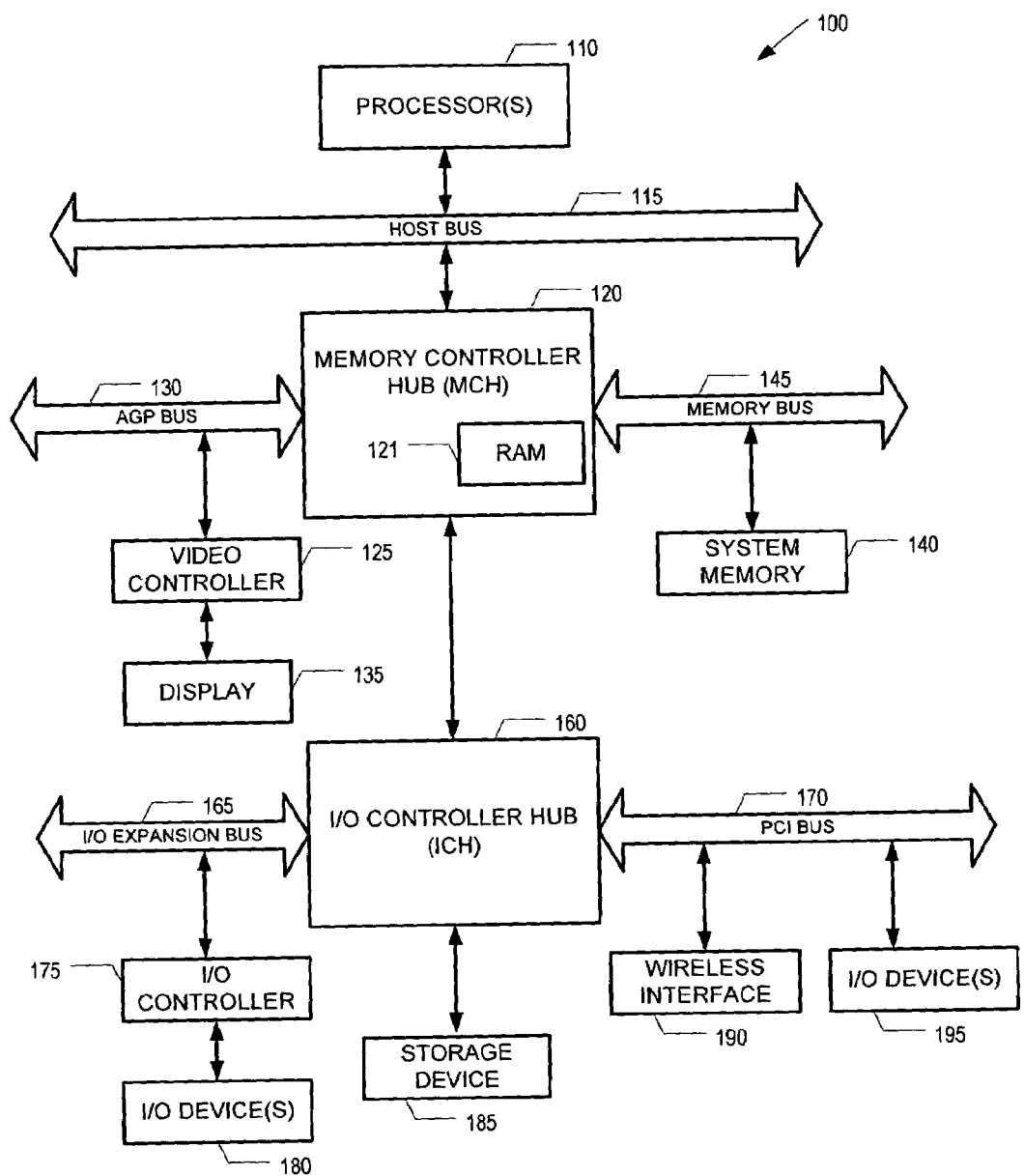
FIG. 1 illustrates a computing system in accordance with an embodiment of the present invention.

FIG. 1 illustrates a computing system 100 in accordance with an embodiment of the present invention. In this embodiment, computing system 100 may include a processor 110, which may include one or more general-purpose or special-purpose processors such as a microprocessor, microcontroller, application specific integrated circuit (ASIC), a programmable gate array (PGA), a digital signal processor (DSP), or the like. Computing system 100 may also be referred to as a computer or data processing system in some embodiments.

Processor 110 may be coupled to a host bus 115. A memory controller hub (MCH) 120, which may be referred to as a memory controller, may also be coupled to host bus 115. A video controller 125 may be coupled to MCH 120 via an Advanced Graphics Port (AGP) bus 130. Video controller 125 may be coupled to a display 135, which may be, for example, a cathode ray tube (CRT) display or a liquid crystal display (LCD).

A system memory 140 may be coupled to MCH 120 via a memory bus 145. Although the scope of the present invention is not limited in this respect, system memory 140 may be a relatively fast volatile memory such as, e.g., a static random access memory (SRAM), a dynamic random access memory (DRAM), or a synchronous DRAM (SDRAM). Alternatively or additionally, system memory 140 may include non-volatile memory such as a NAND or a NOR flash device.

MCH 120 may control the transfer of information within system 100, e.g., between processor 110, MCH 120, and system memory 140. That is, MCH 120 may generate control signals, address signals, and data signals that may be associated with write or read operations. MCH 120 may also include a volatile random access memory (RAM) buffer 121 that may be used to read information stored in system memory 140. For example, RAM buffer 121 may be used to buffer information read from system memory 140 and used to buffer information written to system memory 140.

MCH 120 may also be coupled, e.g., via a hub link 155, to an input/output controller hub (ICH) 160 that is coupled to a input/output (I/O) expansion bus 165 and a Peripheral Component Interconnect (PCI) bus 170, or alternately a bus such as the PCI Express bus, or another third generation I/O interconnect bus. The I/O expansion bus 165 may be coupled to an I/O controller 175 that controls access to one or more I/O devices 180. Examples of I/O devices 180 may include input devices, such as, e.g., a keyboard and/or mouse, output devices, such as, e.g., a display or a speaker, and storage devices, such as, e.g., a memory card. In an alternate embodiment, the I/O controller 175 may be integrated into ICH 160, as may other control functions.

ICH 160 may also be coupled to a storage device 185. Storage device 185 may be a mass storage device such as, for example, a disk memory having a storage capacity of at least about one gigabyte (GB). In various embodiments, storage device 185 may be an electromechanical hard disk memory, an optical disk memory, or a magnetic disk memory, although the scope of the present invention is not limited in this respect.

PCI bus 170 may be coupled to various components including, for example, a wireless interface 190, which may be used in certain embodiments to communicate with remote devices. Although not shown in FIG. 1, wireless interface 190 may include, or be coupled to, a dipole or other antenna, along with other components such as, e.g., a wireless transceiver. In various embodiments, wireless interface 190 may be coupled to system 100 via an external add-in card, or an embedded device. In other embodiments wireless interface 190 may be fully integrated into a chipset of system 100.

Although the description makes reference to specific components of the system 100, it is contemplated that numerous modifications and variations of the described and illustrated embodiments may be possible. Computing system may be a portable personal computer (PC) such as, e.g., a notebook or laptop computer capable of wirelessly transmitting information. However, it is to be understood that embodiments of the present invention may be implemented in another wireless device such as, e.g., a cellular phone, a wireless personal digital assistant (PDA) or the like.

The devices included in system 100 may be address space constrained. For example, I/O devices 180 may be limited to specified system addresses. To be readable or writable, status and control signals of new features must be accessible through the existing address space. Embodiments of the present invention may be implemented in any of the devices in system 100 to improve control signal and status signal density and the readability of control signals.

Figure 2:
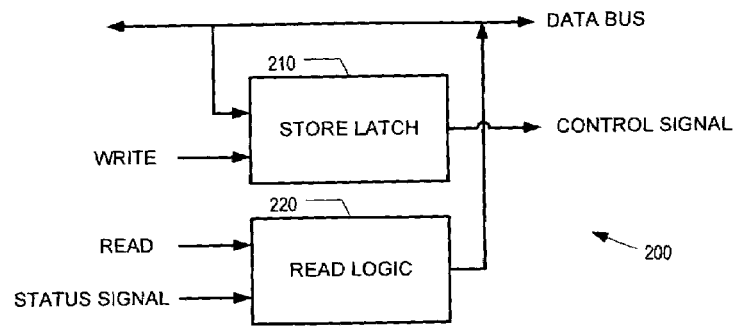
FIG. 2 illustrates control signal and status signal register sharing utilized by an embodiment of the present invention.

FIG. 2 illustrates control signal and status signal register sharing utilized by an embodiment of the present invention. Register 200 includes a control signal latch 210 and a status signal read logic 220. Writing to control signal latch 210 by putting the desired value on the data bus and controlling the write signal causes the control signal to have the desired value. Reading the status signal is achieved by placing the current status of the status signal on the bi-directional data bus as controlled by the read signal. Note that as illustrated, the current state of the control signal cannot be read. Other control signals are not shown for simplicity (clocks, resets, and the like).

Figure 3:
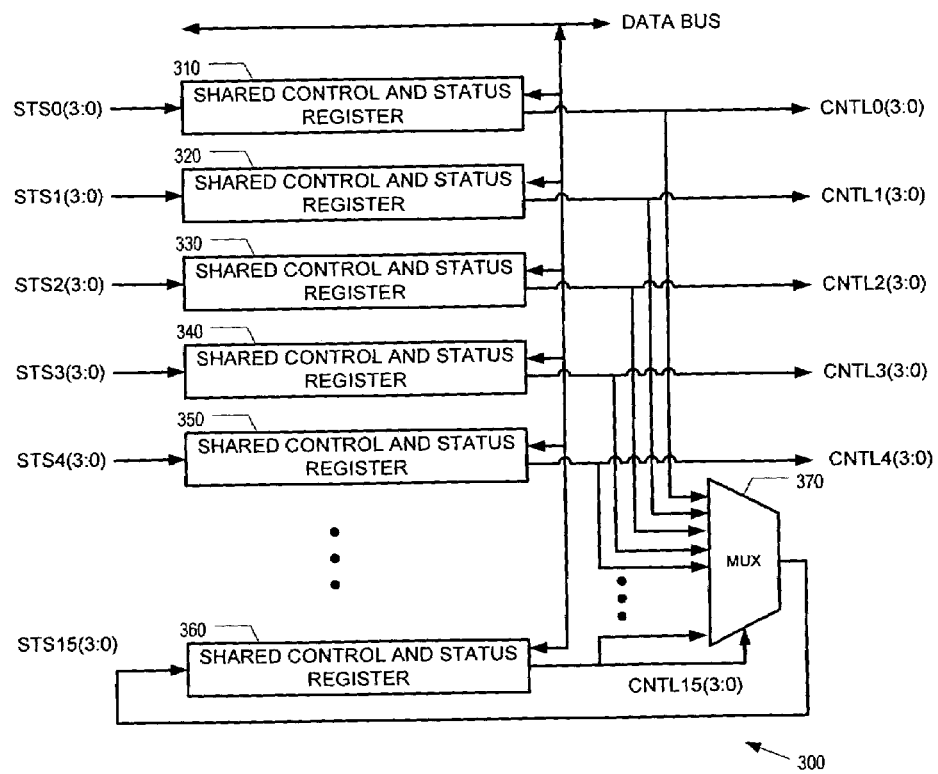
FIG. 3 illustrates control signal and status signal register sharing with read recovery according to an embodiment of the present invention.

FIG. 3 illustrates control signal and status signal register sharing with read recovery according to an embodiment of the present invention. System 300 includes a series of shared control and status registers 310-360. As illustrated, status signals (STS0-15(3:0)) are input into each of the registers and control signals (CNTL0-15(3:0)) are output from each of the registers. A bi-directional data bus allows the control signals to be written and the status signals to be read. Read, write and other control signals are not shown for simplicity. A multiplexer 370 multiplexes all of the control signals (CNTL0-15(3:0)) to produce status signal STS15(3:0). Note that control signals CNTL15(3:0) are also used to control multiplexer 370. By writing various values to shared control and status register 360, different control signals may be read.

A bi-directional data bus is shown in FIGS. 2 and 3. According to an alternate embodiment, a read bus and a write bus may be used. The invention is not limited in this respect.

By utilizing one of the registers for read recovery, a significant amount of information can be read that was unavailable with previous methods. According to an embodiment of the present invention, the number of available input/output signals for a given address space is nearly doubled. As shown, using 16 four bit registers, 60 status signals can be read and 60 control signals can be written and read outputs compared to 32 and 32 with previous methods. This is an 87.5% increase in "signal/register density" for the identical address space.

According to embodiments of the present invention, the same address space as previous generation devices can be utilized while significantly increasing the number of status and control signals across the device.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
    a plurality of registers, wherein each of the plurality of registers put a current status of status signal on a data bus in response to an input read signal and output a control signal based on a status put on the data bus in response to an input write signal; and
    a multiplexer, wherein the multiplexer is controlled by a control signal output from one of the plurality of registers to multiplex all control signals output from the plurality of registers and output one output signal that is used as a status signal input to said one register.

2. The apparatus as recited in claim 1, wherein each of the plurality of registers supports four control signals and four status signals.

3. The apparatus as recited in claim 1, wherein the plurality of registers is accessible within a register space in a flash device.

4. A method of operating an apparatus comprising a plurality of registers and a multiplexer, the method comprising:
    each of the plurality of registers putting a current status of status signal on a data bus in response to an input read signal;
    each of the plurality of registers outputting a control signal based on a status put on the data bus in response to an input write signal; and
    controlling the multiplexer by a control signal output from one of the plurality of registers to cause the multiplexer to multiplex all control signals output from the plurality of registers and then output one output signal that is used as a status signal input to said one register.

5. The method as recited in claim 4, wherein each of the plurality of shared control and status registers supports four control signals and four status signals.

6. A system comprising:

a flash array;

a plurality of registers, wherein each of the plurality of registers put a current status of status signal read from a corresponding portion of the flash array on a data bus in response to an input read signal and output a control signal based on a status put on the data bus in response to an input write signal which controls the corresponding portion of the flash array; and a multiplexer, wherein the multiplexer is controlled by a control signal output from one of the plurality of registers to multiplex all control signals output from the plurality of registers and output one output signal that is used as a status signal input to said one register.

7. The system as recited in claim 6, wherein each of the plurality of shared control and status registers supports four control signals and four status signals.

* * * * *